United States Patent
James et al.

(10) Patent No.: US 10,679,222 B2
(45) Date of Patent: Jun. 9, 2020

(54) METHOD AND APPARATUS FOR REPRESENTING AN IMAGE WITH PLASMONIC PIXELS

(71) Applicant: The University of Melbourne, Melbourne, Victoria (AU)

(72) Inventors: Timothy Denis James, Kensington (AU); Ann Roberts, North Melbourne (AU)

(73) Assignee: The University of Melbourne, Melbourne, Victoria (AU)

( * ) Notice: Subject to any disclaimer, the term of this patent is extended or adjusted under 35 U.S.C. 154(b) by 252 days.

(21) Appl. No.: 15/578,310

(22) PCT Filed: Jun. 2, 2016

(86) PCT No.: PCT/AU2016/050442
§ 371 (c)(1),
(2) Date: Nov. 30, 2017

(87) PCT Pub. No.: WO2016/191817
PCT Pub. Date: Dec. 8, 2016

(65) Prior Publication Data
US 2018/0150849 A1 May 31, 2018

(30) Foreign Application Priority Data
Jun. 2, 2015 (AU) .............................. 2015902086

(51) Int. Cl.
*G06Q 30/00* (2012.01)
*G01J 3/46* (2006.01)
(Continued)

(52) U.S. Cl.
CPC ....... *G06Q 30/0185* (2013.01); *B42D 25/324* (2014.10); *B42D 25/373* (2014.10);
(Continued)

(58) Field of Classification Search
CPC .............. G06Q 30/0185; B42D 25/425; B42D 25/324; B42D 25/373; G02B 5/201;
(Continued)

(56) References Cited

U.S. PATENT DOCUMENTS

2006/0273245 A1 12/2006 Kim et al.
2016/0107471 A1* 4/2016 Landrock ............... G02B 5/201
359/568

FOREIGN PATENT DOCUMENTS

| CA | 2879832 A1 | 2/2014 |
| JP | 2013174683 A | 9/2013 |
| WO | 2013039454 | 3/2013 |

OTHER PUBLICATIONS

Kumar et al. (Printing colour at the optical diffraction limit, Nature Nanotechnology vol. 7, Sep. 2012, pp. 557-561) (Year: 2012).*

(Continued)

*Primary Examiner* — Kimberly N. Kakalec
(74) *Attorney, Agent, or Firm* — Michael Best & Friedrich LLP

(57) ABSTRACT

A plasmonic pixel structure, comprising: a substrate; a plurality of nano-scale structures each comprising conducting and dielectric components, whereby the nano-scale structures are configured to act as nano-antennas. The nano-scale structures 5 have resonant frequencies that depend on the conducting component and sizes of the nano-scale structures. The conducting component and the sizes of the nano-scale structures are selected according to a wavelength component or components of incident light desired to be reflected or transmitted by the nano-scale structures, and the conducting component and the sizes of the nano-scale structures are selected 10 such that the nano-scale structures have respective resonant frequencies corresponding to a colour scheme.

19 Claims, 11 Drawing Sheets

(51) Int. Cl.
- *G02B 5/00* (2006.01)
- *B42D 25/373* (2014.01)
- *B42D 25/324* (2014.01)
- *G02B 5/20* (2006.01)
- *B42D 25/425* (2014.01)
- *B82Y 20/00* (2011.01)
- *G06K 19/06* (2006.01)
- *G06K 7/10* (2006.01)
- *G06K 7/12* (2006.01)
- *G06K 7/14* (2006.01)
- *G06K 19/14* (2006.01)

(52) U.S. Cl.
CPC ............ *B42D 25/425* (2014.10); *G01J 3/462* (2013.01); *G02B 5/008* (2013.01); *G02B 5/201* (2013.01); *B82Y 20/00* (2013.01); *G06K 7/10544* (2013.01); *G06K 7/12* (2013.01); *G06K 7/1443* (2013.01); *G06K 19/06037* (2013.01); *G06K 19/06103* (2013.01); *G06K 19/06159* (2013.01); *G06K 19/06178* (2013.01); *G06K 19/14* (2013.01); *G06K 2019/06271* (2013.01)

(58) Field of Classification Search
CPC ..... G02B 5/008; G01J 3/462; G06K 7/10544; G06K 19/06178; G06K 2019/06271; G06K 19/06103; G06K 19/06159; G06K 19/14; G06K 19/06037; G06K 7/1443; G06K 7/12; B82Y 20/00
See application file for complete search history.

(56) References Cited

OTHER PUBLICATIONS

International Search Report for Application No. PCT/AU2016/050442 dated Jul. 11, 2016 (3 pages).

Tan, S.J. et al., "Plasmonic Color Palettes for Photorealistic Printing with Aluminium Nanostructures," Nano Letters, 2014, No. 14, pp. 4023-4029.

European Patent Office Extended Search Report for Application No. 16802247.3 dated Jul. 17, 2018 (11 pages).

Translation of Japanese Patent Office Action for Application No. 2017-562348 dated Jan. 17, 2020 (4 pages).

* cited by examiner (e)
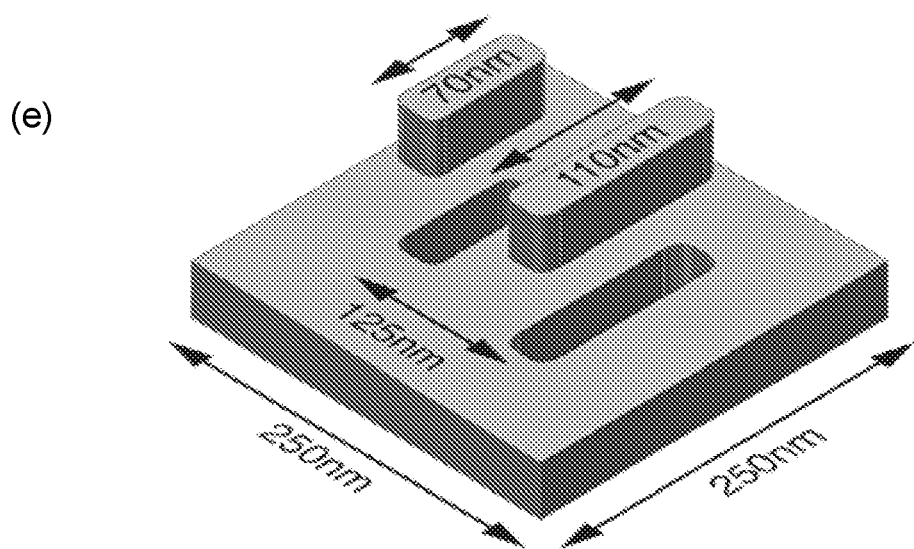
(f)
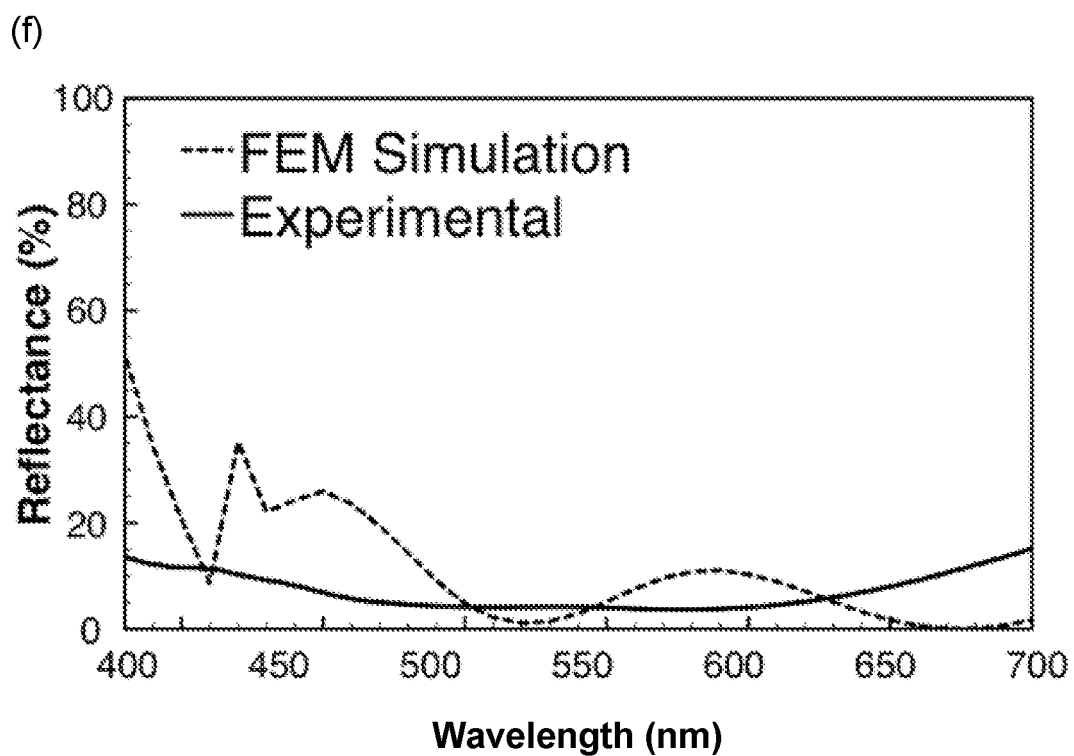
Figure 9 (*cont.*)

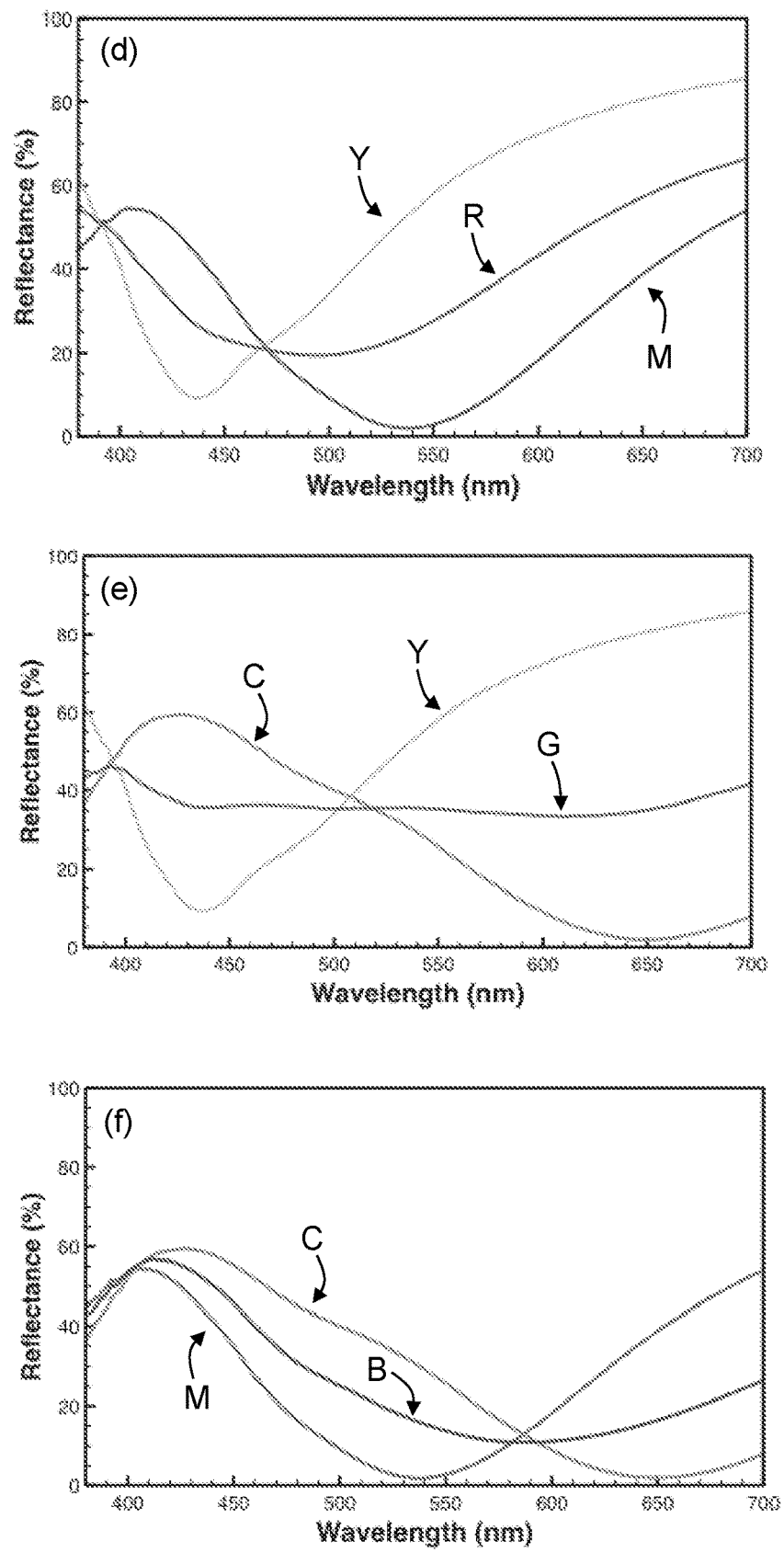
Figure 10 (*cont.*)

METHOD AND APPARATUS FOR REPRESENTING AN IMAGE WITH PLASMONIC PIXELS

RELATED APPLICATION

This application is based on and claims the benefit of the filing and priority dates of Australian patent application no. 2015902086 filed 2 Jun. 2015, the content of which as filed is incorporated herein by reference in its entirety.

TECHNICAL FIELD

The present invention relates to a plasmonic pixel feature, to a method and apparatus for representing an image with plasmonic pixels, and, in particular, to a banknote or other medium incorporating such an image, for example, as a security feature.

BACKGROUND

Nano-fabrication have been used to create images using nano-optics. Developments in the area of plasmonic colour engineering at the nanoscale, using subwavelength nano-structures, and their potential in high-resolution and high-fidelity colour rendering, spectral filtering applications, holography, and three-dimensional stereoscopic imaging are summarized by Gu et al. in *Color generation via subwavelength plasmonic nanostructures*, Nanoscale, 7(15) (2015) 6409-6419, doi:10.1039/C5NR00578G.

However, existing techniques are often limited to subtractive colour and do not provide a wide usable colour pallet. The features that can produce a full range of colour are either optically very weak, or are incompatible with large scale printing processes, and hence not useful as, for example, a security feature.

SUMMARY OF THE INVENTION

According to a first broad aspect of the invention, there is provided a plasmonic pixel structure, comprising:
  a substrate;
  a plurality of nano-scale structures each comprising conducting and dielectric components, whereby the nano-scale structures are configured to act as nano-antennas;
  wherein the nano-scale structures have resonant frequencies that depend on the conducting component and sizes of the nano-scale structures; and
  the conducting component and the sizes of the nano-scale structures are selected according to a wavelength component or components of incident light desired to be reflected or transmitted by the nano-scale structures; and
the conducting component and the sizes of the nano-scale structures are selected such that the nano-scale structures have respective resonant frequencies corresponding to a colour scheme.

It should be noted that the colour scheme is not necessarily confined to the visible spectrum. A colour scheme may comprise, for example, one or more colours or wavelengths of visible, infra-red and/or ultraviolet electromagnetic radiation. Also, it will be appreciated that a nano-antenna can be in the form of essentially any nanostructure that interacts with the incident radiation.

In an embodiment, the colour scheme comprises a plurality of colours.

In one embodiment, the conducting component and the sizes of at least some of the nano-scale structures are selected such that the nano-scale structures have respective resonant frequencies corresponding to a colour of the CMY colour scheme.

The nano-scale structures may comprise nano-scale dipoles. It should be noted that a nano-scale 'dipole' in this context refers to a nano-scale structure that is elongate or with an aspect ratio that is not 1, and hence includes—for example—nano-scale structures that are rectangular, oblong, triangular, elliptical or cam-shaped.

In one embodiment, the nano-scale structures are aligned.

In a particular embodiment, the nano-scale structures comprise nano-scale dipoles and are aligned. This makes the plasmonic pixel structure polarization sensitive, which can be particularly advantageous if the plasmonic pixel structure is to be used in a security application, such as in a security feature of a security document (such as a banknote or passport).

The structure may include at least one portion of the pixel structure without any nano-scale structures, the at least one portion being adapted to appear white or to decrease saturation.

The structure may include at least one portion of the pixel structure the nano-scale structures of which have a mixture of sizes (such as two different lengths), the at least one portion being adapted to appear black or to increase saturation.

It should be noted that, while such regions may be referred to as black, there may in fact appear as—or contribute to the plasmonic pixel structure—dark grey or black, depending on how effectively the nano-scale structures of different sizes provide a pseudo-broadband absorber.

In one embodiment, the conducting component of all the nano-scale structures is of identical material.

The conducting component may comprise a metal or a highly doped semiconductor. The conducting component may comprise aluminium, silver, gold or copper The nano-scale structures may comprise nano-cavities.

In one embodiment, the nano-scale structures comprise nano-scale dipoles that comprise a first dipole comprising a nano-cavity, and a second dipole complementary to the first dipole and displaced relative to the first dipole in a direction perpendicular to a plane of the substrate.

In an embodiment, the conducting component of the nano-scale structures is aluminium, and at least some of the nano-scale structures have respective lengths selected from the group consisting substantially of: 100 nm, 70 nm and 50 nm, wherein 100 nm corresponds to Cyan, 70 nm corresponds to Magenta, and 50 nm corresponds to Yellow. At least some of the nano-cavities may have a mixture of lengths and correspond to black; the mixture of lengths may comprise 50 nm and 80 nm.

The structure may comprise a plurality of sub-pixels, the nano-scale structures being arranged in one or more of the sub-pixels, wherein the sub-pixels correspond respectively to (i) a colour comprising one or components of the colour scheme, (ii) white, or (iii) black. For example, the structure may comprise 4, 9, 16, 25 or 36 sub-pixels, though it will be appreciated that higher perfect-square numbers of sub-pixels are within the scope of this invention, the particular selection depending on intended application and fabrication limitations.

At least one of the sub-pixels may correspond to a colour that comprises a plurality of components of the colour scheme; the at least one of the sub-pixels may comprise a plurality of parallel strips, the strips corresponding to respective colours of the colour scheme.

In an embodiment, the substrate comprises PET or other polymeric material.

According to a second broad aspect of the invention, there is provided an image comprising a plurality of plasmonic pixel structures as described above.

According to a third broad aspect of the invention, there is also provided a document (such as a banknote or other security document) comprising an image as described in the second aspect.

According to a fourth broad aspect of the invention, there is also provided a security feature for a document (such as a security document), the security feature comprising an image as described in the second aspect.

In one embodiment, the nano-scale structures of the respective plasmonic pixel structures comprise nano-scale dipoles and are aligned. That is, there is alignment within any single plasmonic pixel structure, but not necessarily from one plasmonic pixel structure to another.

In a certain embodiment, the nano-scale structures of a plurality of the plasmonic pixel structures comprise nano-scale dipoles and are aligned.

The nano-scale structures of all of the plasmonic pixel structures may comprise nano-scale dipoles and be aligned. This embodiment is expected to provide optimal polarization sensitivity.

This aspect of the invention also provides a security document comprising a security feature as described above.

According to a fifth broad aspect of the invention, there is provided a method of fabricating one or more plasmonic pixel structures, the method comprising:

patterning a substrate with a pattern of nano-cavities corresponding to desired nano-scale structures to act as nano-antennas of the one or more plasmonic pixel structures, the desired nano-scale structures comprising at least one of nano-cavities and nano-posts; and providing the substrate with a conducting material and thereby forming the nano-scale structures;

wherein the conducting component and the sizes of the nano-scale structures are selected according to desired wavelength component or components of incident light desired to be reflected or transmitted by the nano-scale structures, and the conducting component and the sizes of the nano-scale structures are selected such that the nano-scale structures have respective resonant frequencies corresponding to a colour scheme.

In an embodiment, the method includes patterning the substrate using Electron-Beam Lithography.

In an embodiment, the method comprises forming a master with protrusions corresponding to the nano-cavities using Electron-Beam Lithography, then using the master to pattern the substrate with the nano-cavities using nano-imprint lithography.

The method may comprise coating the substrate once patterned with the conducting material in the form of a metal.

The method may comprise coating the substrate once patterned with the conducting material in the form of aluminium.

The method may comprise applying the conducting material the substrate once patterned such that the conducting material is deposited on floors of the nano-cavities formed in the substrate and on lands between nano-cavities formed in the substrate.

The method may comprise applying the conducting material the substrate once patterned such that the conducting material fills the nano-cavities formed in the substrate.

The method may comprise generating the pattern such that the resulting nano-antennas correspond to one or more colours of the colour scheme.

The colour scheme may be the CMY colour scheme.

This aspect of the invention also provides a method of fabricating a security feature (typically comprising an image), the method comprising fabricating a plurality of plasmonic pixel structures according to the method described above.

It should be noted that any of the various individual features of each of the above aspects of the invention, and any of the various individual features of the embodiments described herein including in the claims, can be combined as suitable and desired.

BRIEF DESCRIPTION OF THE DRAWINGS

In order that the invention can be more clearly ascertained, embodiments will now be described, by way of example, with reference to the accompanying drawings, in which:

FIGS. 6A to 6E are schematic views relating to a prototype plasmonic pixel, in which FIGS. 6A and 6C are photographs of two samples of different length floating dipoles with incident light polarized in each of the directions shown in FIG. 6B, FIG. 6E is a plot of reflectance spectra of P1 and P2 for the two samples, and FIG. 6D is an extracted CIE colour chart for the data of FIG. 6E correlating with the photographs of FIGS. 6A and 6C;

DETAILED DESCRIPTION

Figure 1:
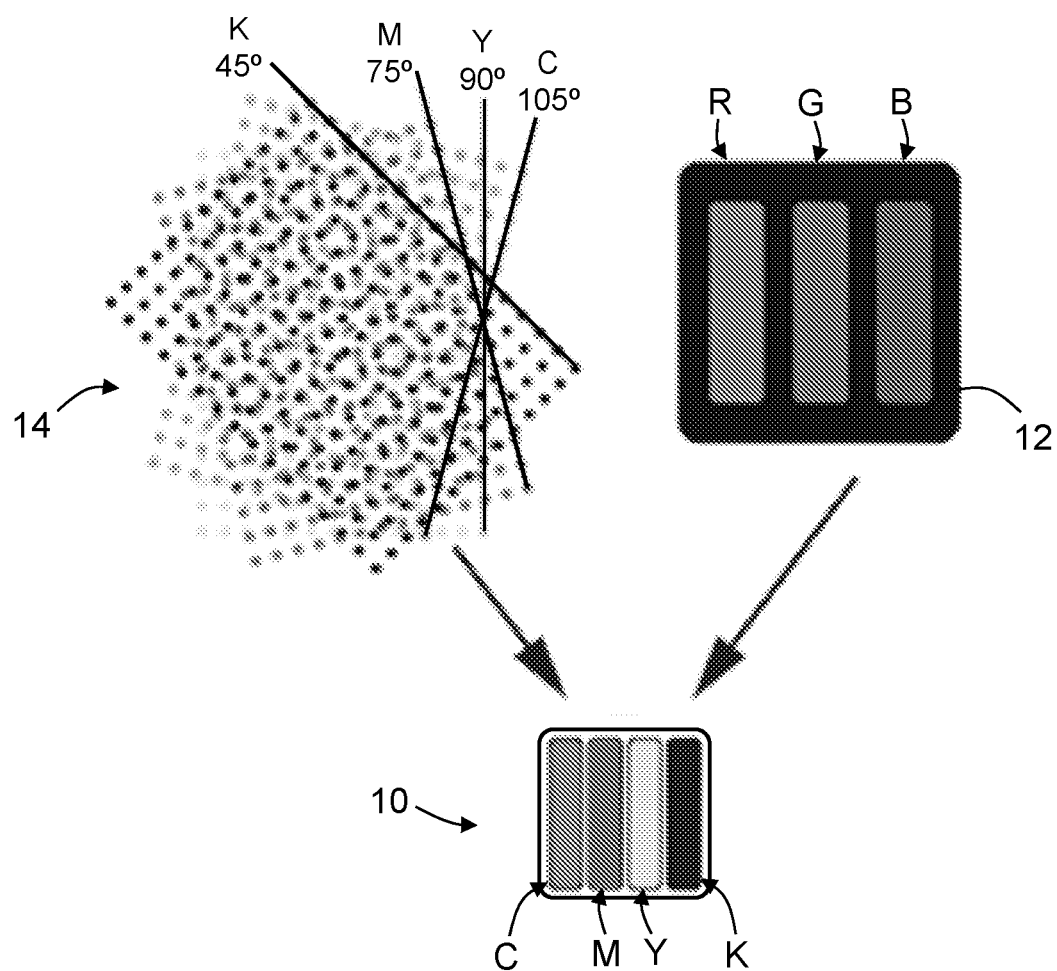
FIG. 1 is a schematic view of a plasmonic pixel according to an embodiment of the present invention and its relationship to an initial RGB pixel and a pixel in the CMYK colour space generated according to this embodiment.

FIG. 1 is a schematic view of a plasmonic pixel 10 according to an embodiment of the present invention, as a picture element of an image, and the relationship of plasmonic pixel 10 to the pixels of the image in the RGB (Red, Green, Blue) colour space 12 (commonly used for pixels used in digital displays) and the CMYK subtractive colour scheme 14 (commonly used for printing on white substrates such as paper). As described below, plasmonic pixel 10 can be used as the building block or unit cell of an image, such as in the form of a plasmonic security feature according to the present invention. For illustrative purposes, plasmonic pixel 10 of FIG. 1 is depicted schematically as comprising a combination of cyan, magenta, yellow and black sub-pixels according to the CMYK colour scheme.

It should be noted that this embodiment uses the CMY or CMYK colour scheme to generate the desired colour or colours of plasmonic pixel 10 and hence of an image or security feature comprising a plurality of such plasmonic pixels 10. However, it should be appreciated that other colour schemes may be used in generating a plasmonic pixel 10, whether known (such as RGB or CMY) or created for this purpose. Such a colour scheme may comprise a single colour: such a scheme—with the use of, for example, white—would allow the creation of monochrome images. However, the colour scheme typically comprises at least two colours.

Plasmonic pixel 10 consists of arrays of nano-scale structures that act as nano-antennas, and these may comprise—for example—apertures or cavities, or a mixture of structure types. The present embodiment employs nano-cavities that are rod-shaped and of a uniform width of 20 to 50 nm, and in this embodiment 30 nm. The length of the nano-cavities in plasmonic pixel 10 is uniform for each particular colour, and typically—in this embodiment—from 50 nm to 150 nm. For example, to provide cyan, magenta and yellow, nano-cavity lengths of 100 nm, 70 nm and 50 nm are employed, respectively. If different base colours or materials are used, the cavity length is also changed accordingly; the appropriate length of the nano-cavities can then be straightforwardly determined from theory or by experiment. Each nano-scale structure (in this example, a nano-cavity) is resonant with incident light; the length of the structure is thus dictated by the intended mode of operation—transmission or reflection—and the wavelength of light that it is desired be transmitted or reflected by the structure.

It might be expected that incident light would not interact with structures such as cavities of this scale, but it is believed that light incident on plasmonic pixel 10 couples to surface electrons on the boundary between metal and dielectric components within the structure (as described below), creating a surface plasmon. A plasmon is essentially a standing surface wave in the conducting layer of electrons on a conducting surface. Plasmons occur at the interface between a conductor, such as a metal, and a dielectric. The resonant frequency of the plasmon is dependent on the metal used and on the particulars of the nanostructured features on the surface. By varying the length of the nano-structures in a metallic surface, the resonant frequency of the array can be changed so it reflects or transmits differing wavelengths or colours of light.

As is also described below, an image (such as for use as a security feature) can be manufactured of plasmonic pixels 10 by breaking the image down into pixels of single colours. Arrays of nano-cavities can then be designed to reflect only the colour required for each pixel. Breaking the image down into pixels of, for example, from approximately 30×30 μm to 60×60 μm permits a detailed colour image to be constructed. In this embodiment, plasmonic pixel 10 is 30×30 μm.

In addition, in this embodiment the image is polarization sensitive, owing to the nano-structures being nano-scale dipoles that are aligned.

Briefly, as shown schematically in FIG. 1 and according to this embodiment, an initial image is first converted into the RGB (Red, Green, Blue) colour space 12. This format is used in digital display devices, where a black background is used and each pixel is illuminated to create the desired colour. The RGB scheme is then replaced by the CMYK subtractive colour scheme 14. In effect, this allows the image to be built from eight distinct colours: the four CMYK (Cyan, Magenta, Yellow, Key (Black)) colours, the RGB colours, which can be built from combinations of the CMYK colours, and the white background. Each colour of plasmonic pixel 10 is obtained by taking the RGB pixel/sub-pixel physical design, and replacing the RGB colour space with the subtractive CMYK colour space. In the case of a security feature, plasmonic pixel 10 comprises a substrate in the form of a conductive or metallic surface, such as silver, gold, copper, or a suitably doped semiconductor. In this embodiment, the substrate is in the form of an aluminium surface and, as described above, plasmonic pixel 10 also includes one or more arrays of nano-cavities. Each array comprises nano-cavities of length 100 nm, 70 nm or 50 nm (respectively serving, in a sense, as Cyan, Magenta and Yellow 'ink'), although K (black) can be provided by nano-cavities/antennas of two different lengths in a given array (in this embodiment, of lengths 50 and 80 nm). Two different lengths are employed to minimize reflection, as the two sets of nano-cavities (of different lengths) will resonate at different wavelengths in the visible spectrum, creating a pseudo-broadband absorber and hence a so-called black pixel (though in practice likely to be dark grey or black).

It should be noted that these lengths may be varied to ensure the correct colours for certain surfaces or structures. For example, to obtain an RGB colour such as a red pixel, plasmonic pixel 10 would be half filled from the yellow array and half from the magenta array; that is, half the area of plasmonic pixel 10 is filled with an array of 50 nm cavities and the other half with an array of 70 nm cavities.

Plasmonic pixel 10 is created using, for example, nano-imprint lithography (NIL) to create nano-cavities in a thin transparent film, and evaporating metal (Al) over the nano-cavities. The master for the nano-imprint lithography is fabricated using electron beam lithography.

Figure 2:
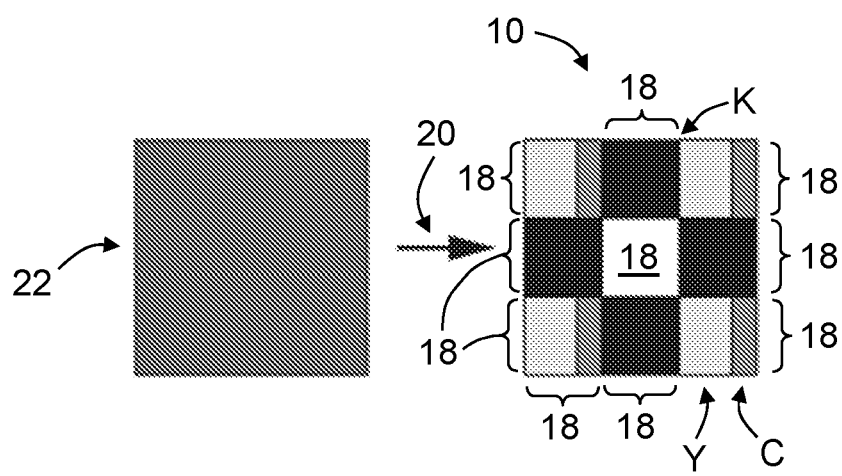
FIG. 2 is a schematic view of the general pixel layout of the plasmonic pixel, made up of a 3×3 array of black, white and CMY colour pixels

In more detail, plasmonic pixel 10 relies on the use of the reflection of incident light from plasmonic pixel 10 (or a feature comprises such plasmonic pixels 10) to produce colour using the CMYK colour space. However, the layout technique of rotating each layer of colour with respect to the other to avoid moiré effects used in conventional printing processes is incompatible with the nanofabrication processes using the creation of the plasmonic pixel structures. The colour layout for the plasmonic pixel uses strips of CMY and blocks of K and white to produce the desired colour, relying on the far-field mixing of the three subtractive primary colours. FIG. 2, for example, shows an exemplary layout of plasmonic pixel 10 that consists of nine square sub-pixels 18 (of identical size and hence, in this embodiment, each of 10×10 µm), each comprising one or more arrays of nano-cavities, each array of nano-cavities constituting a white, black or CMY based block. The illustrated example comprises white, black or cyan and yellow blocks, and plasmonic pixel 10 has been converted 20 from a green RGB pixel 22.

Figure 3:
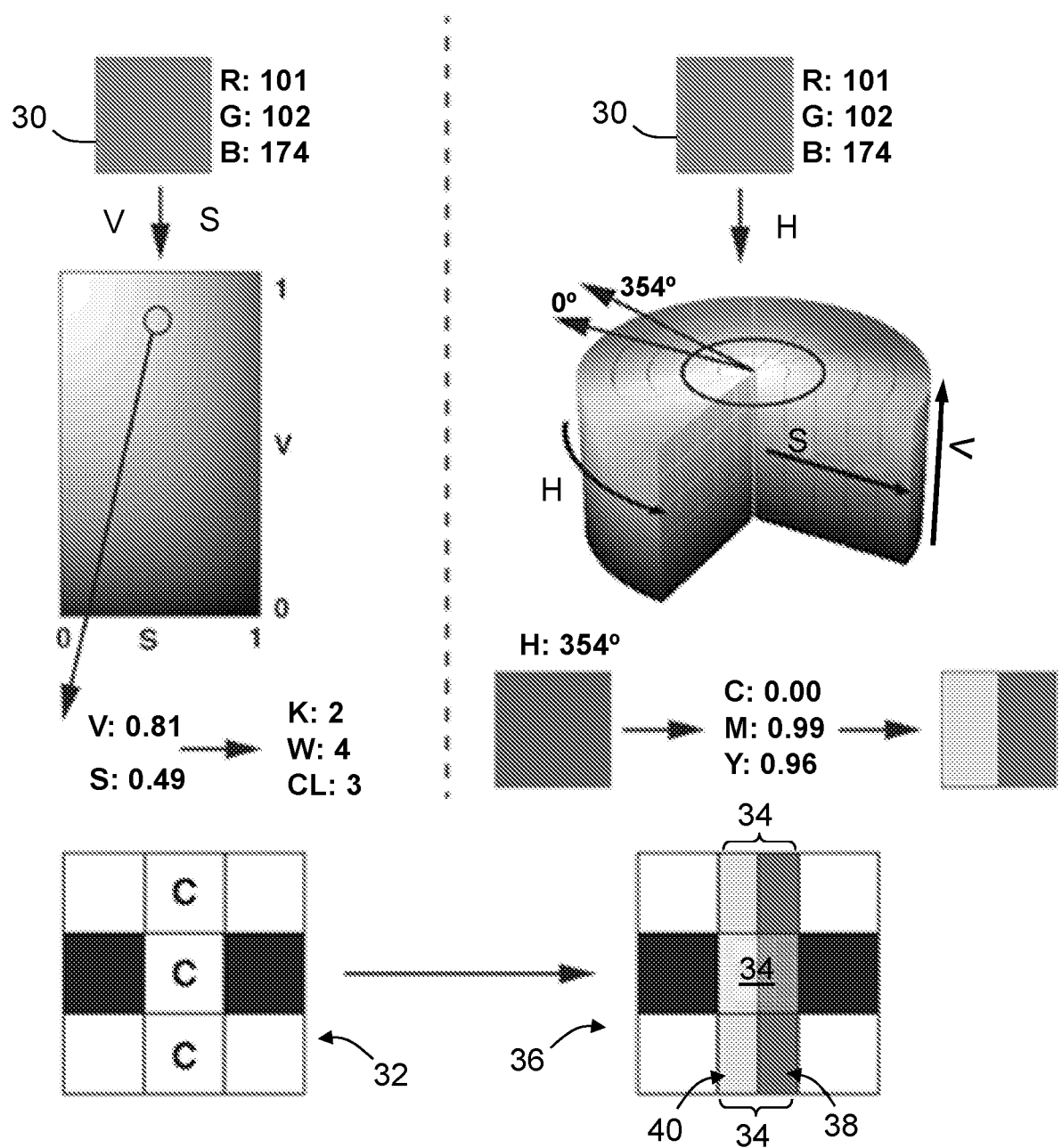
FIG. 3 is a schematic view of a conversion process from an RGB pixel in a digital file to the ratios of C:M:Y to produce the plasmonic pixel layout.

The method for determining the correct mixture for the three subtractive colours (CMY), black (K), and white from a digital RGB-based image is shown schematically in in FIG. 3. Firstly, the pixel is converted from a set of RGB values to the HSV (Hue, Saturation and Value) colour space, which enables the extraction of the saturation and the perceived luminescence in relation to saturation. To put this in terms of the CMYK based plasmonic pixel design, Value determines the K level, and Saturation determines the intensity of the colour (CMY) of the given pixel. Using these Value and Saturation levels determines how many of the sub-pixels 18 (cf. FIG. 2) are white, black or colour in any pixel. The conversion of RGB to HSV enables the calculation of the intensity and luminescence of the pixel. To determine the CMY makeup of the colour pixels the Hue value is used, as it defines the distinct colour, independent of intensity and lightness.

In the example shown in FIG. 3, a red RGB pixel 30 has values for each of the three colours ranging from 0 to 255; in this example, R=101, G=102 and B=174. A standard conversion algorithm is used to convert these RGB values to HSV values, as shown in the upper register of FIG. 3. Next, (1−Value) is used to determine the number of black sub-pixels; in this example, V=0.81, so (1−V=0.19), so 19% of the nine sub-pixels (i.e. 0.19×9=1.71 sub-pixels) should be black. The calculated number of black sub-pixels 18 is then rounded to the nearest integer, so in this example the result is rounded to 2, and thence there should be two black sub-pixels of the nine sub-pixels 18.

Next, the ratio of white to colour sub-pixels is determined for the remaining seven of sub-pixels 18, using the Saturation value. For the given RGB values of the example of FIG. 3, the Saturation is 0.49. According to the method, the number of colour sub-pixels is determined by multiplying S by the number of remaining (i.e. non-black) sub-pixels 18. In this example, S×7=3.43. This result is also rounded to the nearest integer, meaning that three of sub-pixels 18 will be colour. The number of white sub-pixels is then determined as those neither black nor colour, hence—in this example—the number of white sub-pixels is (9−2−3) or four. The resulting division of the plasmonic pixel into black, colour and white sub-pixels is shown at 32 in the lower left register if FIG. 3.

Next, each of the colour sub-pixels is split into a plurality of strips (cf. FIG. 2), each of which can be any of the CMY colours. This embodiment employs 10 such strips per colour sub-pixel, though in other embodiments more or fewer strips may be employed according to required colour fidelity and/or available fabrication equipment. In principle a single strip may be employed, but that would limit the colour of the sub-pixel to a shade of one of C, M or Y.

The colours to be assigned to the strips are determined according to this embodiment by calculating the ratio of intensities and assigning 0 to 10 strips based on this ratio of CMY. More specifically, the CMY values are extracted from the Hue value from the HSV calculation and, owing to the nature of Hue values, the 10 strips will be made up of a combination of either one or two primary subtractive colours (CMY). The sub-pixels designated for colour are split into 10, 1×10 µm strips, where the Hue of the given RGB pixel determines what the corresponding CMY values would be. These calculated CMY values are then used to work out the ratio of C:M:Y, and that ratio is applied to the 10 strips of colour. For example, C:M:Y ratios of 1:3:6 results in 1, 3 and 6 strips of CMY in the sub-pixel.

This one or two subtractive colour requirement to produce any colour for the plasmonic pixel is due to the Hue value being independent of intensity and lightness. From the example in FIG. 3, each of the three colour sub-pixels 34 of the final plasmonic pixel 36 is made up of five magenta strips 38 and five yellow strips 40, which—together—produce the desired red colour. The five magenta strips 38 are depicted as adjacent to one another in this figure, as are the five yellow strips 40. This is expected to give an acceptable result owing to the size of the strips: five strips together have a width in this embodiment of only 5 µm, significantly smaller than the resolution of the human eye (~30 µm at 100 mm). However, in some embodiments it may be desired to alternative the strips, such as where the plasmonic pixels are of a greater size or use few strips (and hence have wider strips), or if it is expected that the final image will be inspected or reproduced in magnified form.

As described above, the physical size of plasmonic pixel 10 of this embodiment is 30×30 µm, and each of sub-pixels 18 has a size of 10×10 µm. This allows a pixel density in plasmonic pixel 10 that results in a resolution of 846 ppi (pixels per inch), which is close to the 900 ppi figure of the absolute limit the human eye can resolve with perfect vision, and over double the resolution of, for example, the screen of an iPhone 6+ (trade mark). This enables a high fidelity image to be reproduced in a relatively small area, such as that required for a banknote security feature. For example, a 2×2 cm feature at 846 ppi would require a 0.444 megapixel image to match the plasmonic pixel design constraints.

FIGS. 4A to 4D illustrate the conversion of a digital RGB image into a machine-readable GDSII (Graphic Design System) file based on the plasmonic pixel design framework method described above. The GDSII file format is used for designing integrated circuits and other nano/microfabrication based technologies, as it provides an industry standard for defining the geometric shapes, labels etc. in a hierarchical form. In the case of the nanostructures used to fabricate plasmonic pixel 10, a high resolution lithography system is employed, such as Electron-Beam Lithography (EBL). For fabricating plasmonic pixel 10, the method of this embodiment uses the RGB to CMYK conversion described above to translate a digital image file into a machine-readable GDSII file. The translation from, for example, a jpeg file to a GDSII file is performed by—in this embodiment—a series of routines developed as a script in the Python (trade mark) programming language. These routines read in the RGB value for each pixel, and perform the conversion by building the GDSII file gradually until the full image has been converted; the Python script finally outputs a complete GDSII file.

The GDSII file contains all the details of the geometry of the nanostructures used to create the CMYK colours for the design of plasmonic pixel 10. The GDSII file is inputted into the EBL tools. These tools take the GDSII file and write the design directly into electron-beam sensitive material, replicating the geometric pattern of the GDSII file and thereby fabricating the nanostructured pattern on a substrate.

Figure 4A:
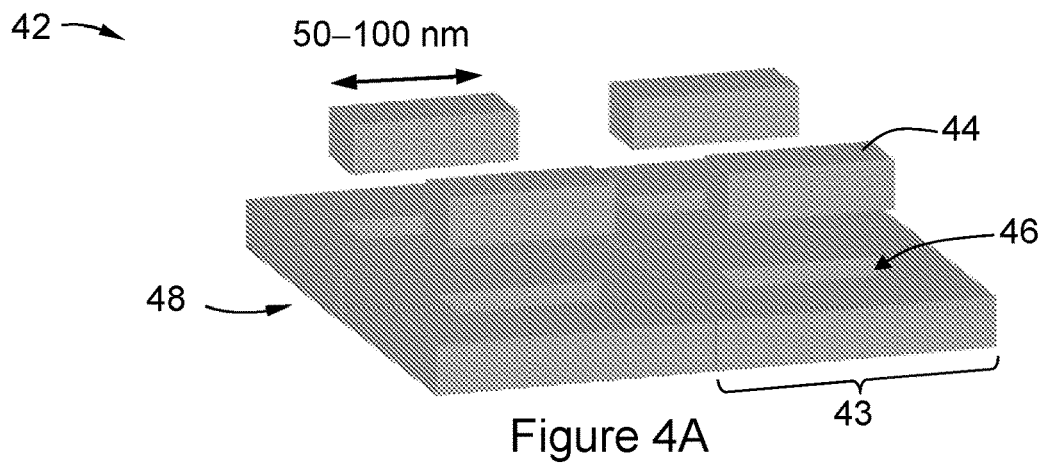
FIG. 4A is a schematic view of a plasmonic pixel feature according to one embodiment of the invention.

FIG. 4A is a schematic view 42 of the physical design of the plasmonic nano-structures employed to produce the CMYK colours. FIG. 4A depicts four identical unit cells 43 each with a nano-structure that comprises first and second nano-scale dipoles. The first nano-scale dipole comprises a nano-cavity, and the second nano-scale dipole comprises a 'floating' dipole that is complementary to the first dipole but displaced relative to the first dipole in a direction perpendicular to a plane of the substrate.

The nano-cavities 46 of each unit cell 43 and hence of plasmonic pixel 10 can be formed in, for example, two ways. Firstly, this design can be produced by embossing the nano-structures into a substrate 46, which may be of curable ink, then applying a layer of aluminium over all the structures, such as by evaporation (see FIG. 5A to 5D). Alternatively, nano-structures 44, 46 can be embossed directly into a suitable aluminium film already applied to substrate 48. Typically, the aluminium film is approximately 30 nm thick.

In the illustrated example, the nano-cavities are 30 nm wide and the unit cell size is 250 nm×250 nm, so the arrangement shown in this figure is 500 nm×500 nm and represents a 400th of a 10×10 µm sub-pixel.

Figure 4B:
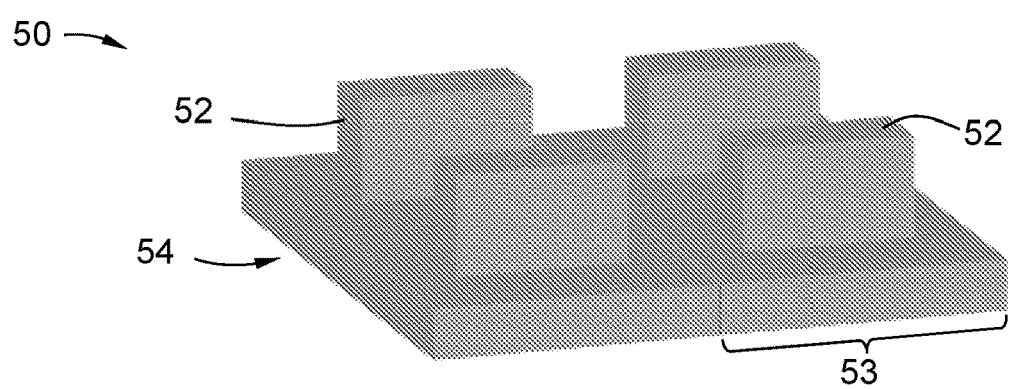
FIG. 4B is a schematic view of a plasmonic pixel feature according to another embodiment of the invention.

FIG. 4B shows, at 50, a schematic view of plasmonic nano-structures 52 of an alternative arrangement, comprising a solid post dipole design. FIG. 4B also depicts four identical unit cells 53; each unit cell 53 has a nano-structure 52 comprising a solid post dipole, and each unit cell 53 is 250 nm×250 nm. In this example, the nano-structures 52 are made by imprinting comparably sized nano-cavities directly into a substrate (such as a polymer or a curable ink) to thereby make an imprint of the desired nano-antenna structures. After any curing, an aluminium layer is evaporated over the nano-cavities. The quantity of Al evaporated is sufficient to fill the imprinted nano-cavities, leaving solid Al nano-structures 52 and an Al substrate 54. The original polymer or curable ink (not shown) is retained above (in this figure) Al nano-structures 52 and Al substrate 54, and the lower surface of the arrangement shown in the figure is coated with another dielectric layer in the form of, for example, a polymer (e.g. a polymer banknote substrate).

Figure 4C:
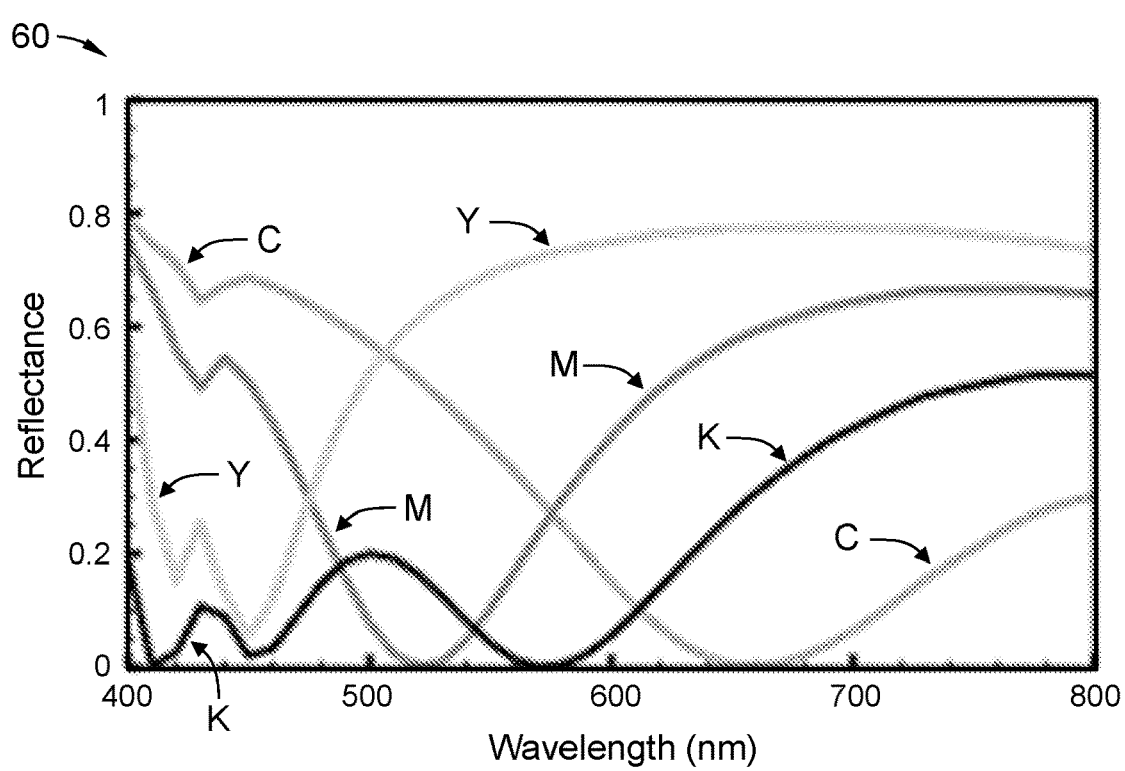
FIG. 4C are reflectance spectra of the antennas lengths for producing colours according to the CMYK colour scheme.

FIG. 4C is a plot 60 of simulated optical reflectance spectra for the plasmonic nano-antenna structure of FIG. 4A; the curves in the figure correspond to plasmonic nano-antenna structures with lengths adapted to provide each of the CMYK colours. Hence, curve C corresponds to Cyan and a nano-antenna structure with a length of 100 nm; curve M corresponds to Magenta and a nano-antenna structure with a length of 70 nm; curve Y corresponds to Yellow and a nano-antenna structure with a length of 50 nm; curve K corresponds to Black and a nano-antenna structure with a length of 50 and 80 nm. The width of the CMYK antennas are all 30 nm.

As shown in FIG. 4A, the structure is in the form of a floating dipole design, where each metal dipole antenna 44 sits above (in this embodiment, 70 nm above) a perforated film plane, and the antennas have 250 nm array pitch for all sizes. The film is provided with slots 48, each of identical shape to the respective corresponding floating antenna 44 above it. The design uses aluminium for the metallic plasmonic material, which is surrounded/supported by a polymer material with a refractive index of approximately 1.5. The optical properties of aluminium may be taken from a standard reference. The multi-layer nature of the design of a dipole antenna 44 and corresponding slot 48 makes the nano-structures 44, 48 a strong absorber at specific frequencies, making it suitable for creating the primary subtractive colours, CMYK, required for the plasmonic pixel design.

Figure 4D:
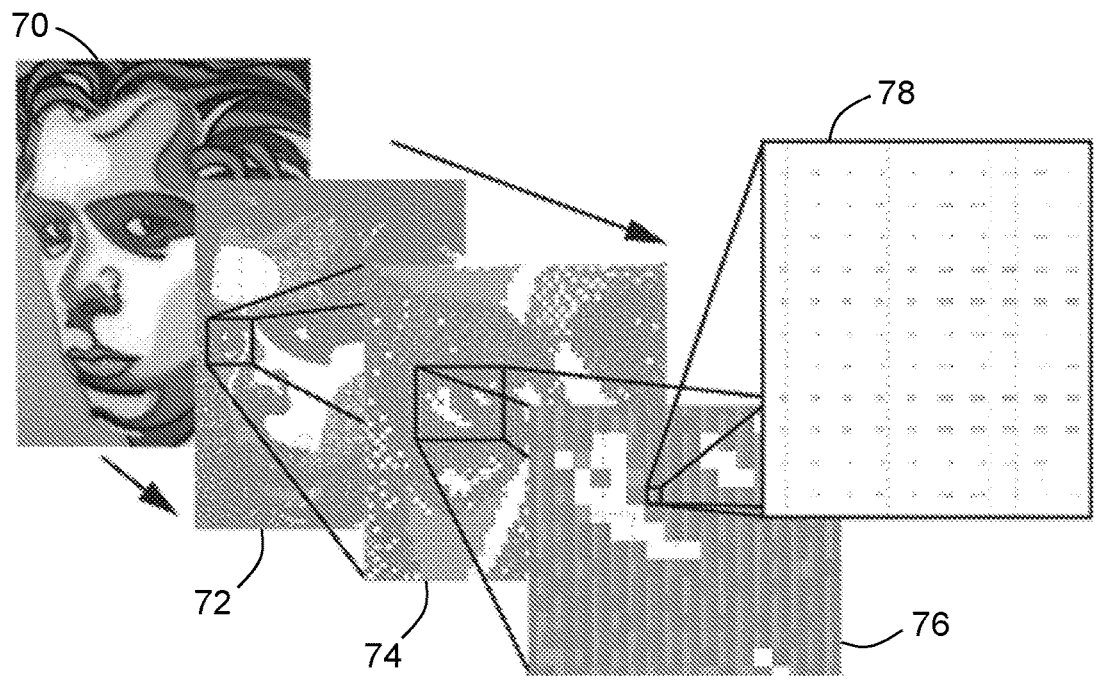
FIG. 4D is a detail of GDSII file used in plasmonic pixel fabrication.

FIG. 4D schematically illustrates the conversion of a jpeg image 70 into a GDSII file as described above, with successive details 72, 74, 76 zooming down to the level where the patterns for the individual nanostructures for the colour are shown as the appropriately sized rectangle for a dipole antenna. As can be seen, an individual nano-antenna sits within a 250×250 nm unit cell 78 regardless of the size of the given antenna and, owing to the fabrication process, only the rectangular shapes of the nano-antennas within cell 78 are required to create the multilevel design.

Figure 5A:
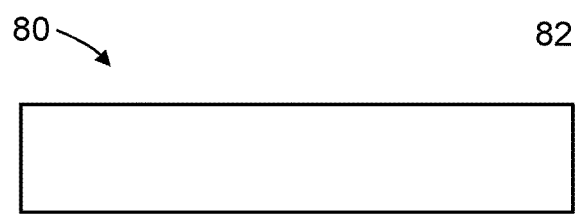
FIGS. 5A to 5D are schematic views of a fabrication process for manufacturing a plasmonic pixel feature integrated with a polymer substrate, such as for use in a banknote.
Figure 5B:
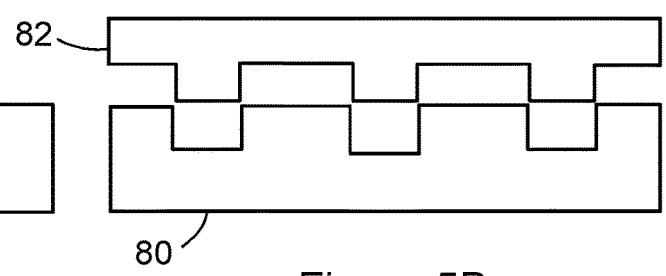
Figure 5C:
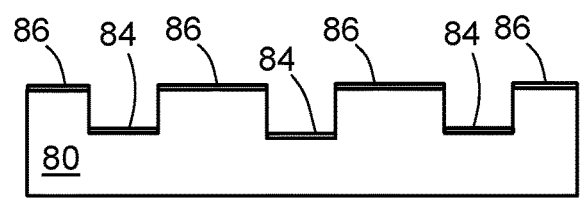
Figure 5D:
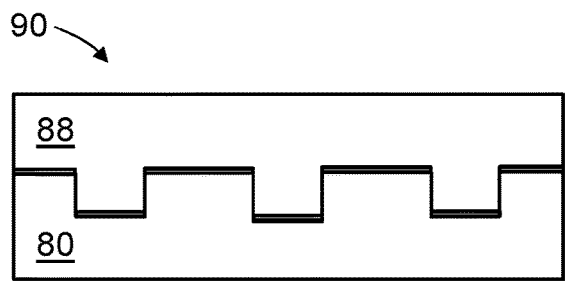

To produce the CMYK colours required for the plasmonic pixel design, a nanofabrication process compatible with nanoimprint lithography capable of producing plasmonic nano-antennas has been developed. FIGS. 5A to 5D schematically illustrate the process of this embodiment for fabricating the three dimensional nanostructure shown in FIG. 4A, comprising three essential steps. In this example, plasmonic pixels are to be fabricated on a polymer banknote (as an anti-counterfeiting mechanism), such as of PET. Hence, FIG. 5A is a schematic cross-sectional view of a polymer substrate 80. Meanwhile, as described above, an imprint master is fabricated using EBL, creating the full image pattern as outlined in the GDSII file in the electron beam sensitive resist; this pattern is used to create a nanoimprint master using known electroplating and stripping processes (such as those used in CD and DVD manufacturing). Referring to FIG. 5B, the polymer banknote substrate 80 is imprinted with the master to create the rectangular nanoimprinted structures (viz. nano-cavities) in film 80. The polymer film 80 is released from the imprint master 82 then, referring to FIG. 5C, aluminium is evaporated onto film 80, such that a nano-antenna structure 84 is formed in the base of each nano-cavity and the complementary corresponding slotted metallic (in this embodiment, Al) film 86 sits on the top of film 80 (wherein the slots are the nanoimprinted structures). Finally, referring to FIG. 5D, substrate 80 is overlaid with a coat 88 of a suitable polymer, such as PET or polypropylene, resulting in an incapsulated multilevel plasmonic structure 90.

EXAMPLES

Preliminary experimental studies have been carried out on the plasmonic pixel design, using a fabrication process similar to that shown in FIGS. 5A to 5D. The prototype fabrication process differed somewhat from the process outlined in FIGS. 5A to 5D. In the prototype fabrication process, a substrate was used that comprised a polymer (PMMA) on a glass support. Advantageously, glass has a similar refractive index to PMMA. The PMMA was in liquid form and was spun onto the surface of the glass to create the EBL resist for patterning. The thickness of the resist is approximately of the same order of magnitude as the size of the features being created.

The polymer layer of the substrate that was patterned directly using EBL (rather than NIL). The sample was then coated in aluminium (cf. FIG. 5C), then an overcoat layer of cured SU8 was used to provide physical robustness (cf. FIG. 5D).

Experimental results from an early prototype are shown in FIGS. 6A to 6E. These results in particular illustrate the polarization sensitivity that can be achieved, which is expected to be of particular value in the manufacture of security features comprising the plasmonic pixels of this embodiment.

Figure 6A:
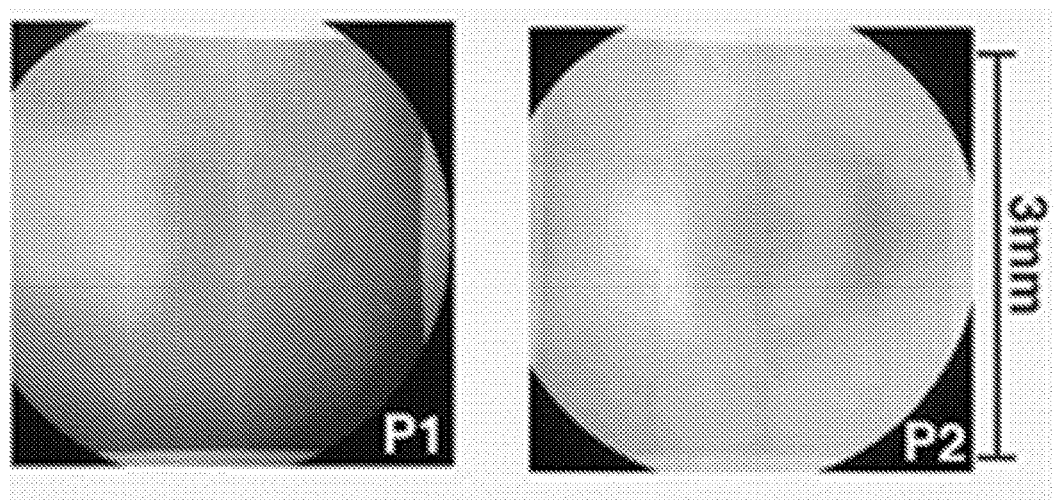
Figure 6B:
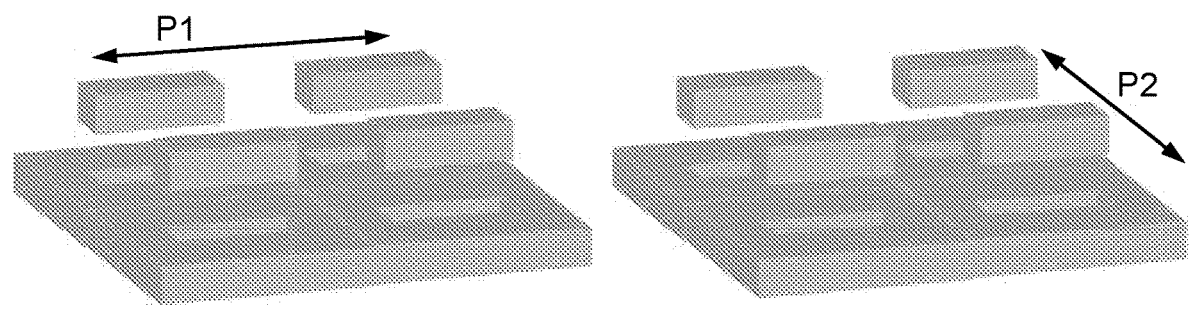
Figure 6C:
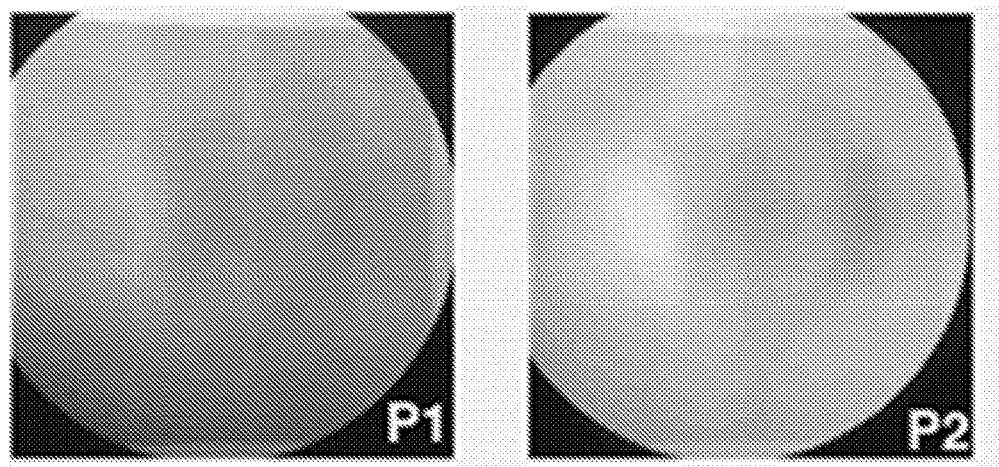

FIGS. 6A and 6C are photographs (originally in colour but rendered here in grayscale) of a 3×3 mm area of two samples each of plasmonic pixels comprising different sized nanostructures, respectively, in each case in two different illumination polarizations to demonstrate the sensitivity to polarization of the colour effects. FIG. 6B shows the orientation of the two different polarizations used (P1 and P2) in taking the images and the capturing of reflectance data (shown in FIG. 6E). Thus, the left image in FIG. 6A is a photograph of the first sample of plasmonic pixels taken with polarization P1, that is, with the illumination polarization aligned with the floating dipoles. The right image in FIG. 6A is a photograph taken with polarization P2, that is, with the illumination polarization aligned perpendicular to the floating dipoles. Similarly, the left image in FIG. 6C is a photograph of the second sample of plasmonic pixels taken with polarization P1, that is, with the illumination polarization aligned with the floating dipole, while the right image in FIG. 6C is a photograph taken with polarization P2, that is, with the illumination polarization aligned perpendicular to the floating dipoles.

Figure 6D:
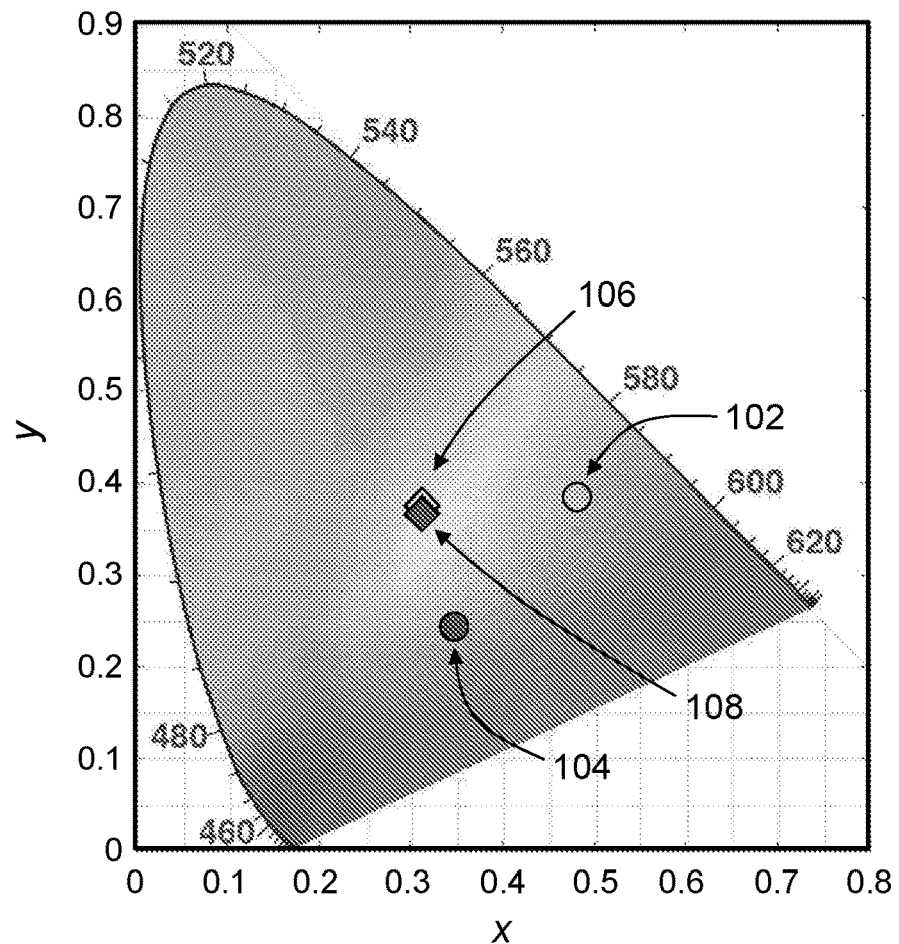

The colour response of the reflectance data can then be calculated and used as a way of corroborating the colours observed in the photographs, and the data measured directly from the sample. FIG. 6D is an extracted CIE colour chart for the reflectance data of FIG. 6E, correlating with photographs of FIGS. 6A and 6C. The CIE chart includes the points showing the P1 and P2 responses of the two different samples: colour 1 and colour 2 where the polarization was aligned with the floating dipole (i.e. P1) are plotted at 102 and 104 respectively; it will be seen that polarization P1 produces bright, saturated colours. Colour 1 and colour 2 with off polarization (i.e. P2) are plotted at 106 and 108 respectively; it will be seen that polarization P2 produces dull, washed out blue/green colours.

Figure 6E:
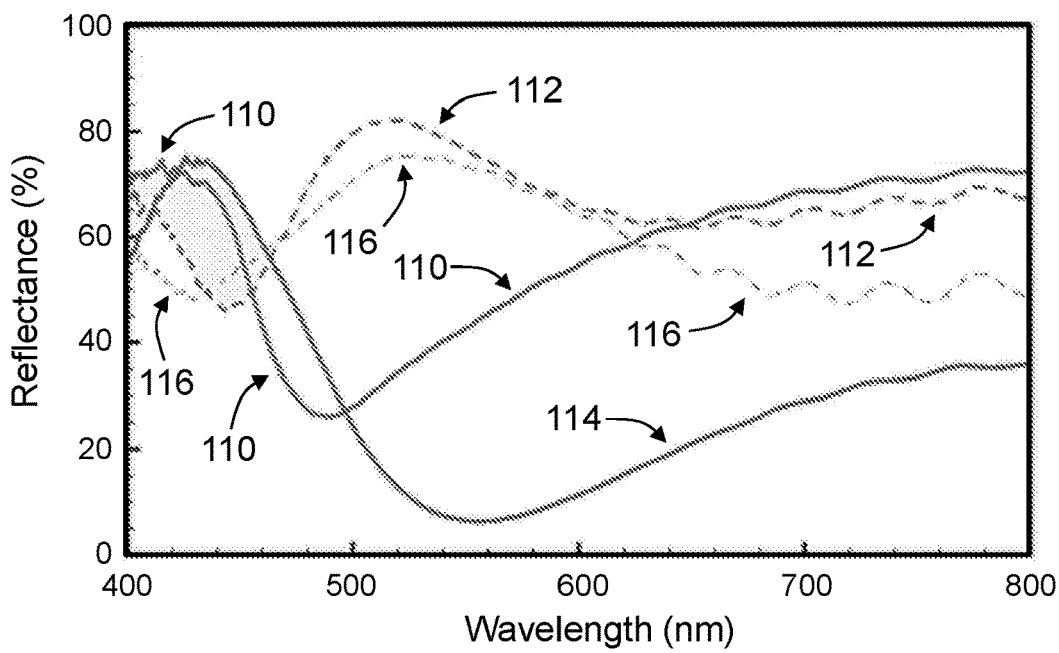

In FIG. 6E, the reflectance curves are:
i) colour 1, polarization P1: curve 110;
ii) colour 1, polarization P2: curve 112;
iii) colour 2, polarization P1: curve 114; and
iv) colour 2, polarization P2: curve 116.

Figures 7A, 7B, 7C:
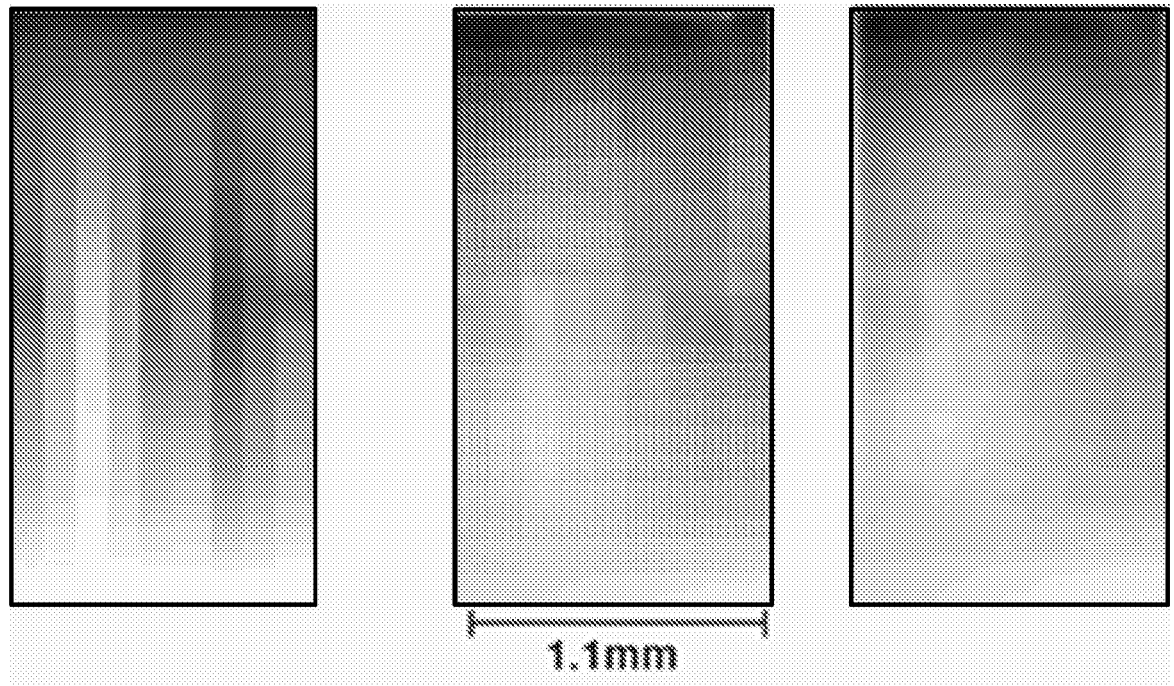
FIGS. 7A to 7C shows larger area studies into the effect of white and black pixels on the Saturation and Value of the colour pixels, illustrating the far-field imaging effect of sub-pixel colour blending, being respectively an initial jpeg image, a focussed image of the initial image once reproduced with plasmonic pixels according to an embodiment of the present invention, and a defocussed image of the initial image once reproduced with plasmonic pixels according to an embodiment of the present invention.

Some further, larger area examples were produced, to examine banknote feature sized designs, and in particular the effect of the white and black pixels on the observed colour. FIGS. 7A to 7C and FIGS. 8A to 8C show two examples. In FIGS. 7A to 7C, a colour, Value and Saturation test was performed to illustrate the tuning of colour, Value and Saturation to achieve a wide colour gamut. FIGS. 7A to 7C are respectively an initial jpeg image, a focussed image of the initial image once reproduced with plasmonic pixels according to an embodiment of the present invention, and a defocussed image of the initial image once reproduced with plasmonic pixels according to an embodiment of the present invention. These figures thus illustrate the far-field imaging effect of sub-pixel colour blending.

Figures 8A, 8B, 8C:
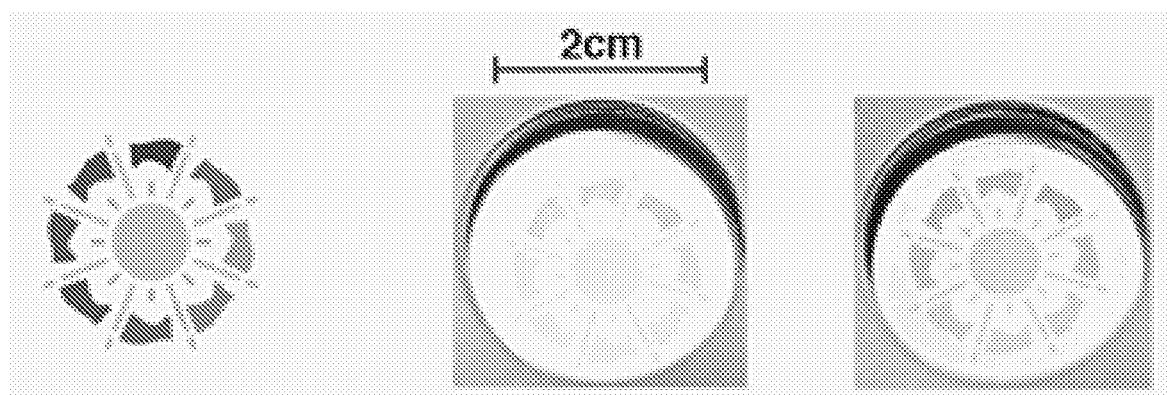
FIGS. 8A to 8C shows larger area studies into an early banknote sized feature prototype illustrating the polarization sensitivity of the colour in the feature, being respectively an initial jpeg image, the same image reproduced with plasmonic pixels according to an embodiment of the present invention and off-polarization illumination and the same image reproduced with plasmonic pixels according to an embodiment of the present invention and on-polarization image.

FIGS. 8A to 8C shows larger area studies into an early banknote sized feature prototype illustrating the polarization sensitivity of the colour in the feature, and demonstrate the production of large features with polarization dependant colour properties. FIGS. 8A to 8C are respectively an initial jpeg image, the same image reproduced with plasmonic pixels according to an embodiment of the present invention and off-polarization illumination, and the same image reproduced with plasmonic pixels according to an embodiment of the present invention and on-polarization image.

Figure 9:
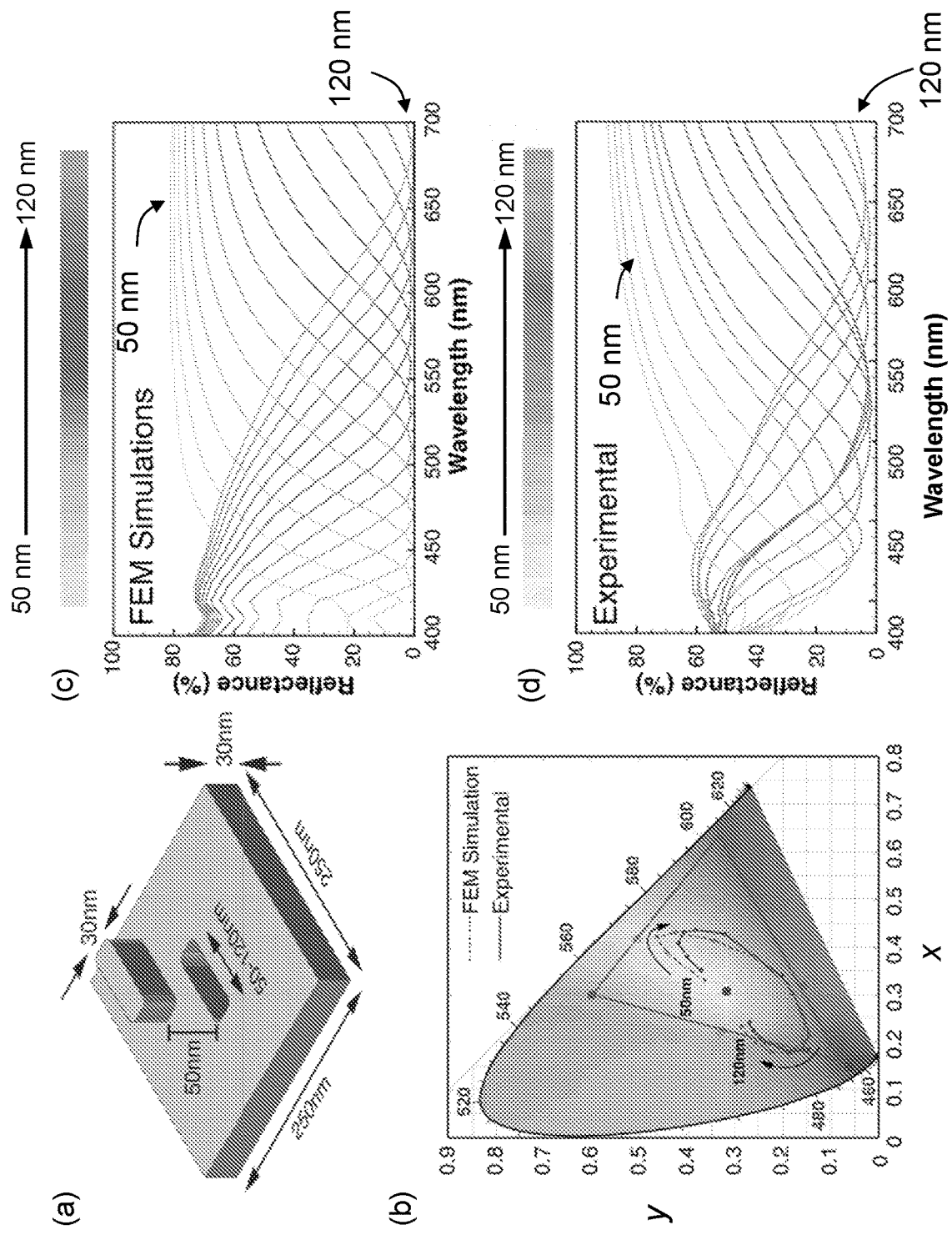
FIG. 9 presents experimental and simulation results for an exemplary aluminium single floating dipole plasmonic nanostructure plasmonic pixel according to an embodiment of the invention.

FIG. 9 presents experimental and simulation results for an exemplary aluminium single floating dipole plasmonic nanostructure plasmonic pixel. FIG. 9(a) shows schematically a floating dipole plasmonic nanostructure constituting the fundamental building block of a plasmonic pixel according to an embodiment of the present invention. A single element is used for the subtractive color palette, film and antenna thickness of 30 nm, gap between the top of a perforated film and the bottom of the floating dipole antenna is set to 50 nm, antenna width of 30 nm, antenna length ranging from 50-120 nm and a unit cell size of 250×250 nm. The rod shaped nanostructures have a distinct advantage over circular/disk antennas as the rod resonance is of greater intensity and as a result the color response is more saturated. However, the asymmetry of the structure introduces a polarization dependence. In this example, the floating-dipole design takes advantage of the lossy nature of aluminum, as it acts as a tunable perfect absorber, where altering the length of the rod and slot alters the central wavelength of the peak optical absorption of the structure. FIG. 9(b) is a CIE Color Chart illustrating the response of an array of plasmonic pixel cells by varying the length of the floating dipole. Experimental and simulation results are presented in FIGS. 9(c) and 9(d): FIG. 9(c) shows simulated reflectance spectra and perceived color with a $D_{65}$ source (i.e. a CIE Standard Illuminant D65) for the plasmonic pixel design with varying floating dipole lengths, and FIG. 9(d) presents experimental reflectance spectra and photograph above the plot of the plasmonic pixel arrays with antenna lengths ranging from 50 to 120 nm (each square 200×200 μm in size).

The plasmonic pixel is illuminated from the rod side of the structure, and the presence of absorption minima in the reflectance spectra is used to generate a subtractive color palette. Specifically yellow, magenta and cyan colors are obtained with floating dipole lengths of 70, 90 and 120 nm, respectively. The major difference between the FEM simulation of the floating dipole design and the experimental results is the saturation of the observed yellow color response of the device. This trend is clearly observable in the CIE Color Chart of FIG. 9(b), where the simulation and experiment are nearly identical, except for the shortest antenna lengths, corresponding to the yellow part of the chart. This variation is primarily due to the roughness of the evaporated aluminum films, caused by relatively large grain sizes, which results in a broadening of the resonance and a reduction in the relative intensity. This in turn leads to less saturated 'yellows' as predicted by the simulation. The challenge to produce strongly saturated yellow colors could be overcome with further optimization of the aluminum evaporation process by adjusting evaporation parameters such as evaporation rate and substrate temperature.

To achieve a full subtractive color palette capable of replicating the CMYK printing process, the K or black is required. In theory, the combination of CMY should produce black, but—in practice—it tends to be perceived by eye as an unsatisfactory muddy-brown. As shown in FIG. 9(e), black is achieved by creating a broad-band near-perfect absorber using a two-element floating dipole design of floating dipole with antenna lengths of 70 and 110 nm, and a center-to-center spacing of 125 nm. This two-element design is compatible with the single element design strategy, in that it requires the same unit-cell size, and the same spacing between the thin film and nano-antenna. FIG. 9(f) shows that by combining two nano-antennas in a single cell, a broad absorption response can be achieved. The observed colors corresponding to the simulated and experimental spectra are shown as colored squares, in FIG. 9(f), where a $D_{65}$ source has been used as the illumination source.

Figure 10:
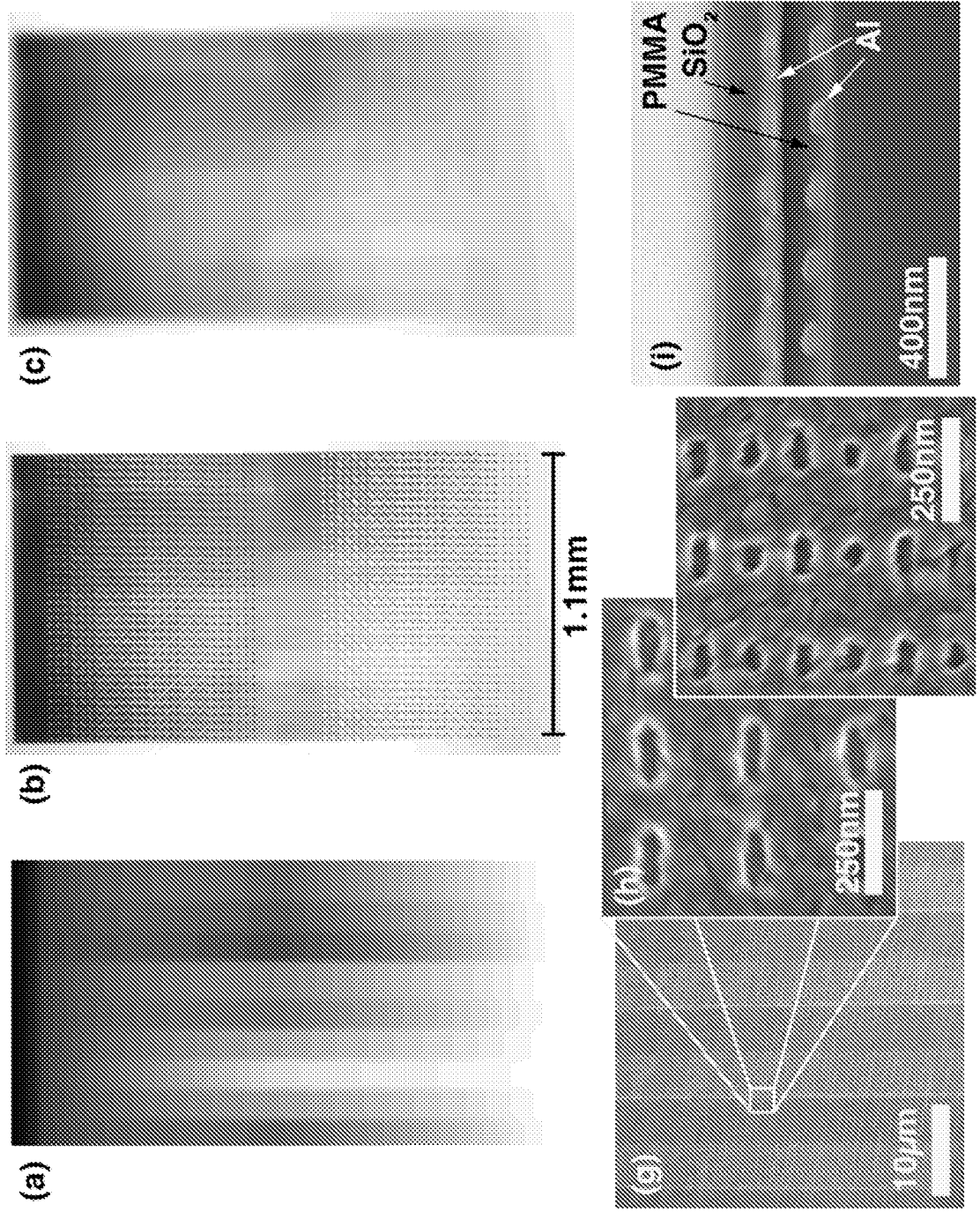
FIG. 10 shows an exemplary test structure according to an embodiment of the invention, and test results.

Test structures were fabricated, an example of which—together with test results—are shown in FIG. 10. FIG. 10(a)

presents a test pattern used to demonstrate the capabilities of the plasmonic pixel, where saturated versions of the primary subtractive and additive color spaces are varied from completely de-saturated, to saturated. FIGS. 10(b) and 10(c) show magnified photographs of the fabricated test structure, where the focused image (cf. FIG. 10(b)) illustrates how the sub-pixels are varied to achieve the smooth gradient of saturation and brightness through the mixing of white and black sub-pixels, respectively. FIG. 10(c) is a defocused magnified photograph of the test structure, and is representative of what is observed with the unaided eye, where the sub-pixels merge to produce smooth variations in saturation and brightness. FIGS. 10(d), 10(e) and 10(f) show the measured reflectance spectra for the subtractive color mixing of CMY to produce RGB, where the averaging of the two mixed subtractive colors produce the resulting additive color: FIG. 10(d) shows yellow (Y)+magenta (M) to give red (R), FIG. 10(e) yellow (Y)+cyan (C) to give green (G), and FIG. 10(f) magenta (M)+cyan (C) to give blue (B). It is clear from FIG. 10(e) that green is the most difficult color to achieve with the design presented here. This difficulty is due to the broadening of the resonances used to produce the mixing colors, yellow and cyan, as the overlap between the two resonances is too large, and this significantly reduces the intensity of the resulting green color. The challenge of producing green could be overcome by increasing the fidelity of the nano-structures and reducing the grain size of the aluminum film, which would result in narrower yellow and cyan resonances, and therefore a more saturated green response. Included in FIG. 4 are SEM images of the of the plasmonic pixel design, where the slots are observable in FIG. 4 (h) for the cyan colored sub-pixel and for the double-antenna black sub-pixel in a top down view of the floating-dipole design. A cross-sectional SEM image of the floating-dipole design is presented in FIG. 10(i), where the Al dipole antennas are clearly separated by the PMMA layer from the perforated Al film above, creating the floating-dipole structure. It is clear from these images the fidelity of the patterning is excellent, despite the non-ideal grain size of the aluminum film.

It will be seen from these Examples that the colours of the plasmonic pixels are polarization sensitive, and that the ability to tune from black to white with all the desired intermediate colours demonstrates the control and range of colours made available according to these embodiments. Furthermore, it is evident that a feature may be fabricated according to these embodiments that is of a substantial size, and indeed sufficiently large to be used as a macroscopic feature, including—for example—as a security feature, such as for a banknote or other security document.

It will also be understood to those persons skilled in the art of the invention that many modifications may be made without departing from the scope of the invention. For example, the plasmonic material can be a number of different metals (e.g. silver, gold, copper or iron) or heavily doped semiconductors (e.g. thin film silicon). The plasmonic pixel need not comprise only rod-shaped structures; a plasmonic pixel may instead comprise cross-shaped structures, thereby providing two different images for two different polarizations. Other shapes may be used, or as may combinations of different shaped structures. The variations in antenna configuration will provide different polarization sensitive effects. In the embodiments described above, the layout of the structure includes the aforementioned solid and floating dipoles, which constitute two ways of producing the same effect using similar fabrication methods, but other fabrication techniques will be apparent to those skilled in the art.

It will also be understood that the reference to any prior art in this specification is not, and should not be taken as an acknowledgement or any form of suggestion that the prior art forms part of the common general knowledge in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A plasmonic pixel structure, comprising:
a substrate;
a plurality of nano-scale structures each comprising a conducting component and a dielectric components, whereby the nano-scale structures are configured to act as nano-antennas;
wherein the nano-scale structures have resonant frequencies that depend on the conducting component and sizes of the nano-scale structures;
the conducting component and the sizes of the nano-scale structures are selected according to a wavelength component or components of incident light desired to be reflected or transmitted by the nano-scale structures; and
the conducting component and the sizes of the nano-scale structures are selected such that the nano-scale structures have respective resonant frequencies corresponding to a colour scheme,
wherein at least one portion of the pixel structure includes nano-scale structures having a mixture of sizes, wherein the at least one portion is adapted to appear black corresponding to a broad absorption response.

2. A structure as claimed in claim 1, wherein the colour scheme comprises the CMY colour scheme or other plurality of colours.

3. A structure as claimed in claim 1, wherein the nano-scale structures comprise nano-scale dipoles and/or aligned nano-scale structures.

4. A structure as claimed in claim 1, including at least one portion of the pixel structure without any nano-scale structures, wherein the at least one portion is adapted to appear white or to decrease saturation.

5. A structure as claimed in claim 1, wherein the conducting component comprises a metal or a highly doped semiconductor.

6. A structure as claimed in claim 1, wherein the nano-scale structures comprise:
  i) nano-cavities; or
  ii) nano-scale dipoles that comprise a first dipole comprising a nano-cavity, and a second dipole complementary to the first dipole and displaced relative to the first dipole in a direction perpendicular to a plane of the substrate.

7. A structure as claimed in claim 1, wherein the nano-scale structures comprise nano-scale dipoles that comprise a first dipole comprising a nano-cavity, and a second dipole complementary to the first dipole and displaced relative to the first dipole in a direction perpendicular to a plane of the substrate.

8. A structure as claimed in claim 1, comprising a plurality of sub-pixels, the nano-scale structures being arranged in one or more of the sub-pixels, wherein the sub-pixels correspond respectively to (i) a colour comprising one or more components of the colour scheme, (ii) white, or (iii) black.

9. A structure as claimed in claim 8, wherein at least one of the sub-pixels corresponds to a colour that comprises a plurality of components of the colour scheme.

10. An image comprising a plurality of plasmonic pixel structures as claimed in claim 1.

11. A document or a security feature for a security document, the document or security feature comprising an image as claimed in claim 10.

12. A security document comprising a security feature, the security feature comprising an image as claimed in claim 10.

13. A structure as claimed in claim 1, wherein the conducting component of the nano-scale structures is aluminium, and at least some of the nano-scale structures have respective lengths selected from the group consisting substantially of: 100 nm, 70 nm and 50 nm, wherein 100 nm corresponds to Cyan, 70 nm corresponds to Magenta, and 50 nm corresponds to Yellow, wherein at least some of the nano-cavities have a mixture of lengths and correspond to black and the mixture of lengths comprises 50 nm and 80 nm.

14. A method of fabricating one or more plasmonic pixel structures, the method comprising:
    patterning a substrate with a pattern of nano-cavities corresponding to desired nano-scale structures to act as nano-antennas of the one or more plasmonic pixel structures, the desired nano-scale structures comprising at least one of nano-cavities and nano-posts; and
    providing the substrate with a conducting material and thereby forming the nano-scale structures having a conducting component and a dielectric component;
    wherein the conducting component and the sizes of the nano-scale structures are selected according to desired wavelength component or components of incident light desired to be reflected or transmitted by the nano-scale structures, and
    the conducting component and the sizes of the nano-scale structures are selected such that the nano-scale structures have respective resonant frequencies corresponding to a colour scheme
    wherein the colour scheme includes black sub-pixels, wherein the black-sub pixels include nano-scale structures having a mixture of sizes configured to provide a broad absorption response.

15. A method as claimed in claim 14, comprising forming a master with protrusions corresponding to the nano-cavities using Electron-Beam Lithography, then using the master to pattern the substrate with the nano-cavities using nano-imprint lithography.

16. A method as claimed in claim 14, comprising coating the substrate once patterned with the conducting material in the form of a metal.

17. A method as claimed in claim 14, including applying the conducting material to the substrate once patterned such that the conducting material: (i) is deposited on floors of the nano-cavities formed in the substrate and on lands between nano-cavities formed in the substrate, and/or (ii) fills the nano-cavities formed in the substrate.

18. A method as claimed in claim 14, comprising generating the pattern such that at least some of the resulting nano-scale structures correspond to one or more colours of the colour scheme.

19. A method of fabricating a security feature, the method comprising fabricating a plurality of plasmonic pixel structures according to the method of claim 14.

* * * * *